(12) United States Patent
Hsu

(10) Patent No.: US 9,487,256 B2
(45) Date of Patent: Nov. 8, 2016

(54) SEAT ADJUSTMENT ASSEMBLY

(75) Inventor: Jung Yu Hsu, Tainan (TW)

(73) Assignee: Kind Shock Hi-Tech Co., Ltd., Tainan (TW)

( * ) Notice: Subject to any disclaimer, the term of this patent is extended or adjusted under 35 U.S.C. 154(b) by 473 days.

(21) Appl. No.: 13/012,003

(22) Filed: Jan. 24, 2011

(65) Prior Publication Data

US 2012/0104221 A1   May 3, 2012

(30) Foreign Application Priority Data

Oct. 28, 2010   (TW) .............................. 99220836 U

(51) Int. Cl.
*B62J 1/08* (2006.01)
*B62K 19/36* (2006.01)
*A47C 3/30* (2006.01)

(52) U.S. Cl.
CPC .. *B62J 1/08* (2013.01); *A47C 3/30* (2013.01); *B62J 2001/085* (2013.01); *B62K 19/36* (2013.01)

(58) Field of Classification Search
CPC ..... B62J 1/08; B62J 2001/085; B62K 19/36; A47C 3/30; F16F 9/3242
USPC .............. 248/161, 157, 599, 631, 162.1; 297/344.19, 215.13; 403/109.1; 52/126.6; 267/64.12, 64.26, 132; 280/226.1, 287, 281.1
See application file for complete search history.

(56) References Cited

U.S. PATENT DOCUMENTS

| | | | | |
|---|---|---|---|---|
| 4,485,996 A * | 12/1984 | Beukema et al. | ............ | 248/407 |
| 4,580,749 A * | 4/1986 | Howard | ........................ | 248/161 |
| 5,078,351 A * | 1/1992 | Gualtieri | ........................ | 248/161 |
| 7,306,206 B2 * | 12/2007 | Turner | ........................ | 267/64.12 |
| 7,540,362 B2 * | 6/2009 | Knaust et al. | ............ | 188/322.15 |
| 2006/0082203 A1 * | 4/2006 | Gasser | ........................ | 297/344.19 |
| 2009/0108642 A1 * | 4/2009 | Hsu | ........................ | 297/195.1 |
| 2011/0097139 A1 * | 4/2011 | Hsu | ........................ | 403/109.1 |
| 2011/0257848 A1 * | 10/2011 | Shirai | ........................ | 701/49 |
| 2012/0243931 A1 * | 9/2012 | Hsu | ........................ | 403/109.1 |

* cited by examiner

*Primary Examiner* — Ingrid M Weinhold
(74) *Attorney, Agent, or Firm* — Rosenberg, Klein & Lee

(57) ABSTRACT

A bicycle seat adjustment assembly includes a fixing member connected to a seat and a lever pivotably connected to the fixing member. An outer tube is connected to a bicycle frame and an inner tube is located in the outer tube. The inner tube is connected to the fixing member. A cylinder is located within the outer tube and the inner tube. The inner tube is connected to the fixing member. A piston rod of the cylinder is connected to the fixing member and is operated by the lever. The cylinder has an end fixed to the outer tube. A sleeve is located at the bottom end of the inner tube, and another sleeve is located between the inner tube and a reception portion of the outer tube to guide movement of the inner tube relative to the outer tube and cylinder.

14 Claims, 8 Drawing Sheets

SEAT ADJUSTMENT ASSEMBLY

FIELD OF THE INVENTION

The present invention relates to a seat adjustment assembly, and more particularly, the movement of the inner tube relative to the outer tube that is smooth and reliable.

BACKGROUND OF THE INVENTION

A conventional bicycle seat is connected to the top of the seat tube which is inserted into the seat tube of a bicycle frame. The height of the seat needs to be adjusted for different users. When riding along a downward road, the bicycle frame tilts an angle so that the rear portion of the bicycle frame is higher than the front portion so that the seat becomes higher and may hit the user's hip. Therefore, the seat needs to be lower to avoid possible injury.

The conventional bicycle seat adjustment device is located between the seat and the bicycle frame, and generally includes an inner tube and an outer tube in which the inner tube is received. A pneumatic cylinder or hydraulic cylinder is located between the inner and outer tubes. The position rod extends out from an end of the cylinder and compressed by a lever which is pivotably connected to a fixing member located at the underside of the seat. By operating the lever to push the piston rod, the piston rod is lowered or extended due to the changes of the paths in the cylinder. The movement of the piston rod moves the seat to a desired position.

A conventional bicycle seat adjustment device is disclosed in Taiwan Patent Application No. 089221346 and comprises a fixing member connected to the underside of the seat. A driving hole is defined through the fixing member and a lever is pivotably connected to the fixing member. The lever has an end that contacts the driving hole and the other end extends so it can be operated by the user. A guide rod has a polygonal cross section and is fixed to the underside of the fixing member. The guide rod includes a groove. The guide rod includes a passage and a pin slidably received in the groove. The pin has one end extending out from the driving hole of the fixing member and contacts one end of the lever. A spring is mounted to the pin and located between the lever and the fixing member. A soft pad is matches the shape of the groove and is engaged with the groove. A hollow tube is mounted to the guide rod and has two holes in the top end thereof. A threaded end piece is connected to the bottom end of the hollow tube. A pressure tube is located in the hollow tube and located beneath the guide rod. A piston is movably received in the pressure tube. The piston includes a front driving rod and a rear driving rod which is in contact with the front driving rod. The front and rear driving rods cooperate with multiple rings and control apertures to control the movement of the guide rod. A head piece is a hollow member and is mounted to the top end of the hollow tube. A reception room is defined in a side of the head piece and communicates with the central passage of the head piece. Two threaded holes are defined in two vertical walls of the reception room and a threaded rod extends through the two threaded holes. Two adjustment blocks are two curved blocks and the inner diameter of the two blocks are matched with the polygonal outer contour of the guide rod and the outer diameter of the blocks can be forced into the hollow tube. Each adjustment block has an engaging piece which is located corresponding to the passage of the hollow tube. When the two adjustment blocks are mounted to the guide rod, the engaging pieces are located in the holes of the hollow tube.

The guide rod is connected with the pressure tube, by the cooperation of the front and rear driving rods and the multiple rings, the guide rod is moved, so that the user can operates the lever to adjust the seat.

However, the pressure tube is received in the hollow tube and is not well positioned. When the guide rod and the piston move, the pressure tube may rotate and shift off from the center to affect the adjustment of the seat. Furthermore, when the guide rod and the piston move, the pressure tube is moved relative to the guide rod and the piston, so that the bottom end of the guide rod hits the top of the pressure tube, and this may lead to leakage and generate noise.

The present invention intends to provide a bicycle seat adjustment assembly to improve the shortcomings of the conventional seat adjustment device.

SUMMARY OF THE INVENTION

The present invention relates to a bicycle seat adjustment assembly and comprises a fixing member connected to an underside of a seat and a lever is pivotably connected to the fixing member. A connection part extends from an under side of the fixing member. The connection part has a passage and an end of the lever is located at an end of the passage. An outer tube has a first end connected with a bicycle frame and a second end of the outer tube has a reception room which communicates with an interior of the outer tube. A collar is mounted to an outside of the reception room of the outer tube. A first positioning member is connected to the first and of the outer tube. An inner tube is located in the outer tube and a first end of the inner tube extends out from the outer tube and is connected with the connection part. A cylinder is located between the outer tube and the inner tube. A piston rod is located in the cylinder and a first end of the piston rod extends out from a first end of the cylinder and is connected to the connection part within the passage. The first end of the piston rod is in contact with the lever. A first positioning portion is connected to a second end of the cylinder and connected to the first positioning member. A sleeve is mounted to a second end of the inner tube. The sleeve guides the inner tube relative to the cylinder to move the inner tube relative to the outer tube smoothly and stably. The cylinder is connected to the first positioning portion which is firmly connected to the first positioning member so that when the inner and outer tubes have relative axial movement, the cylinder does not swing.

The primary object of the present invention is to provide a bicycle seat adjustment assembly, wherein a first sleeve and a second sleeve are respectively located at the bottom end of the inner tube and between the inner tube and the outer tube so as to guide the inner tube relative to the cylinder and the outer tube to move the inner tube relative to the outer tube smoothly and stably. The inner tube and the cylinder are always located at the central axis and do not swing to affect the movement.

Another object of the present invention is to provide a bicycle seat adjustment assembly, wherein the cylinder is equipped with a buffering member to buffer the impact between the cylinder and the fixing member when the inner tube moves relative to the outer tube.

Yet another object of the present invention is to provide a bicycle seat adjustment assembly, wherein the cylinder is equipped with a first positioning portion and the positioning member in the outer tube has a positioning hole that is complementary to the shape of the first positioning portion so that the cylinder is maintained at the central position.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
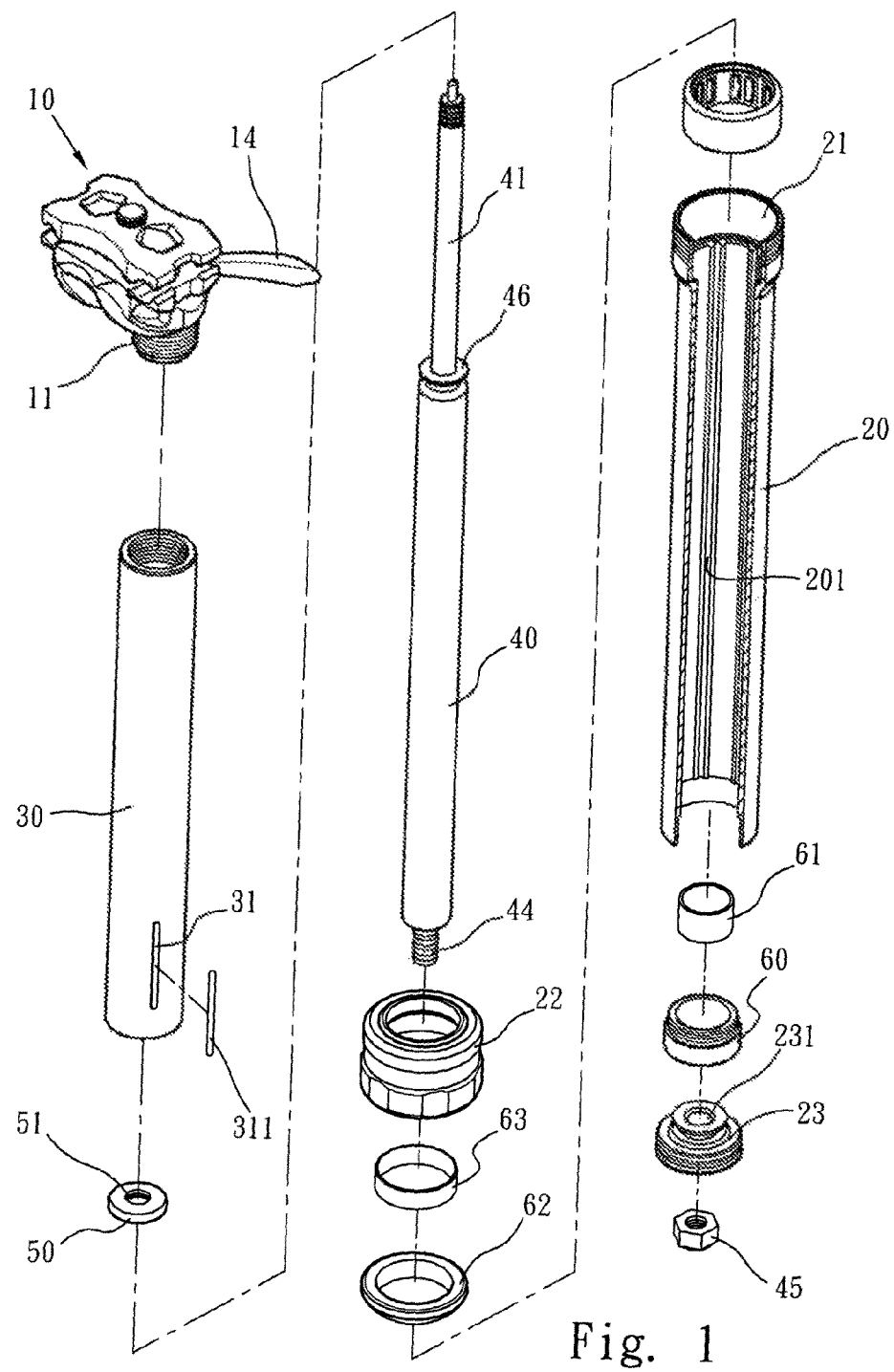
FIG. 1 is an exploded view to show the seat adjustment assembly of the present invention.
Figure 2:
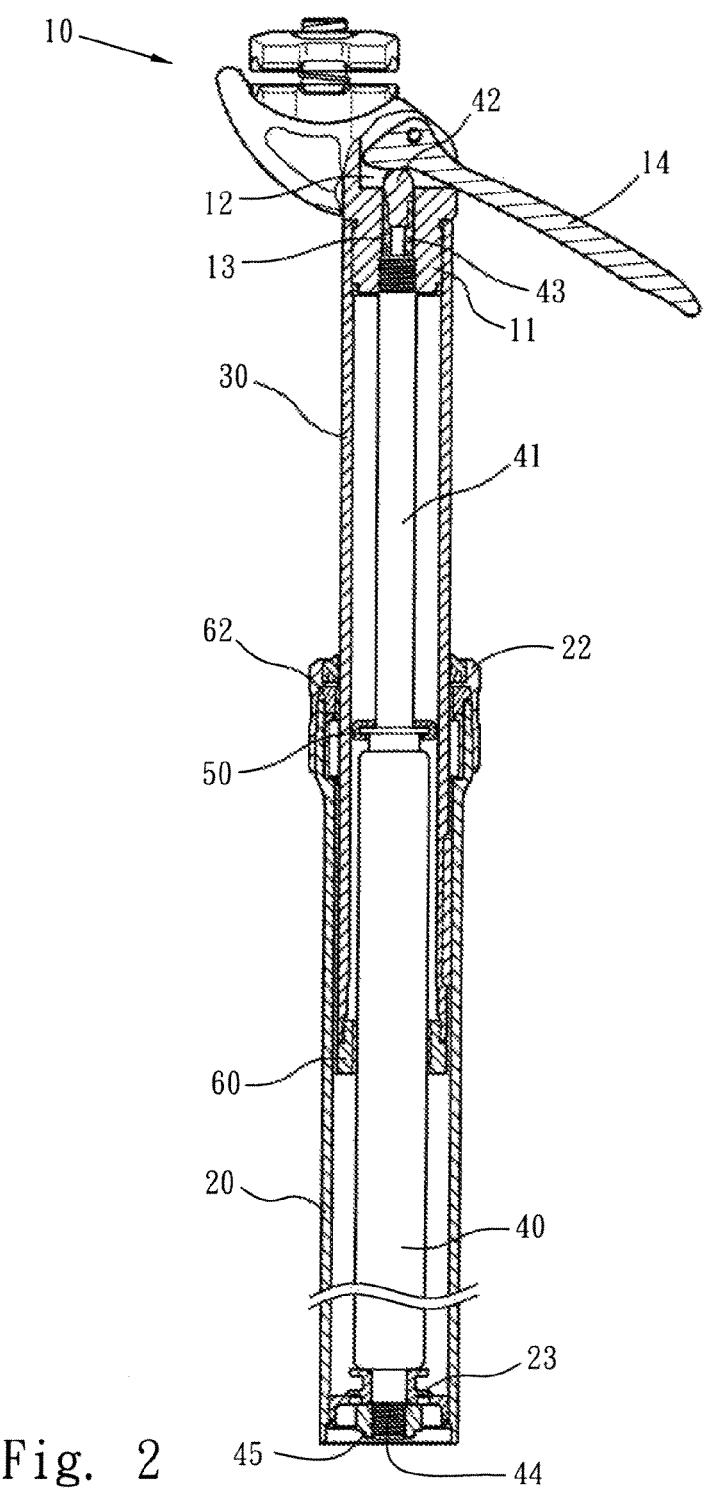
FIG. 2 is a cross sectional view of the seat adjustment assembly of the present invention.
Figure 3:
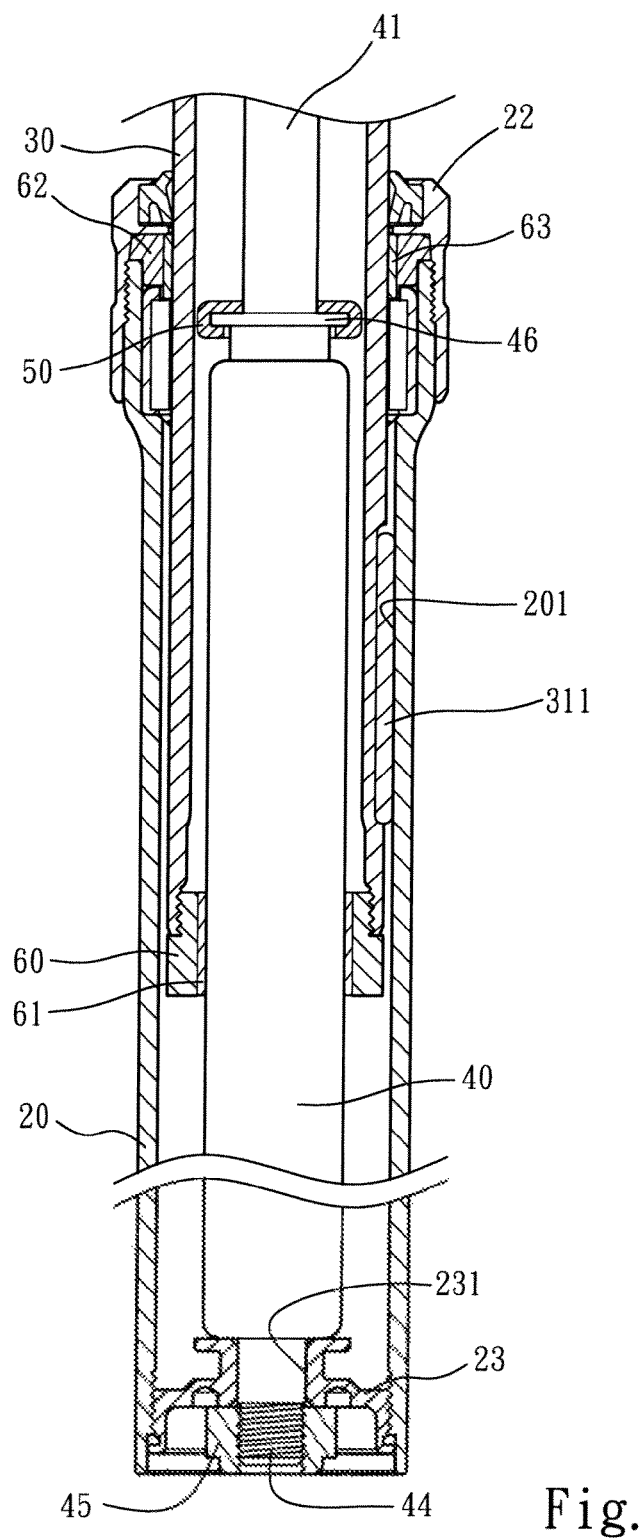
FIG. 3 is an enlarged cross sectional view of the seat adjustment assembly of the present invention.

Referring to FIGS. 1 to 3, the bicycle seat adjustment assembly of the present invention comprises a fixing member 10, an outer tube 20, an inner tube 30 in the outer tube 20, and a cylinder 40 extending between the outer and inner tubes 20, 30. The cylinder 40 is connected with the fixing member 10.

The fixing member 10 is connected to the underside of a seat and a connection part 11 extends from the under side of the fixing member 10. A recess 12 is defined in the fixing member 10 and located above the connection part 11. The connection part 11 has a passage 13 which communicates with the recess 12. A lever 14 has its mediate portion pivotably connected to the fixing member 10 and an end of the lever 14 located at an end of the passage 13.

The outer tube 20 has a first end connected with a bicycle frame and a second end of the outer tube 20 has a reception room 21 which communicates with the interior of the outer tube 20. A collar 22 is mounted to outside of the reception room 21 of the outer tube 20. A first positioning member 23 is connected to the first end of the outer tube 20 and includes a through hole 231 defined centrally therein.

The inner tube 30 is located in the outer tube 20 and a first end of the inner tube 30 extends out from the outer tube 20 and the collar 22 so as to be connected with the connection part 11. The inner tube 30 includes at least one slot 31 defined through a wall of the second end thereof. In this embodiment, there are three slots 31 and each slot 31 receives a rod 311 therein. The rods 311 provide the friction between the inner and outer tubes 30, 20 and increase the stability of the connection between the inner and outer tubes 30, 20.

The cylinder 40 can be a pneumatic cylinder or a hydraulic cylinder, and includes paths for the air or liquid flowing therethrough. A piston rod 41 is located in the cylinder 40 and a first end of the piston rod 41 extends out from a first end of the cylinder 40 and is connected to the connection part 11 within the passage 13. The first end of the piston rod 41 is in contact with the lever 14. A pressing member 42 is located between the first end of the piston rod 41 in the passage 13 and the lever 14. A spring 43 is located between the piston rod 41 and the pressing member 42. A first positioning portion 44 is connected to a second end of the cylinder 40 and connected to the first positioning member 23. The first positioning portion 23 is a threaded rod which extends through the through hole 231 and is connected with a fastening member 45, which is a nut. The fastening member 45 can also be a pin which extends through the first positioning portion 44 after the first positioning portion 44 extends through the through hole 231.

The first end of the cylinder 40 has a second positioning portion 46 connected thereto which is an annular member. By pivoting the lever 14 to compress the pressing member 42 and the first end of the piston rod 41, the piston rod 41 is retracted to adjust the communication of the paths in the cylinder 40 so as to move the piston rod 41 and the inner tube 30.

A buffering member 50 is connected to the second positioning portion 46 and has a hole 51 defined centrally through. The piston rod 41 extends through the hole 51.

A first sleeve 60 is mounted to a second end of the inner tube 30 and a first bush 61 is received in the first sleeve 60. The first bush 61 is mounted to the outside of the cylinder 40 and is made by plastic.

A second sleeve 62 is located between the reception room 21 and the collar 22. A second bush 63 is located in the second sleeve 62 and is mounted to the outside of the inner tube 30. The second bush 63 is made of plastic.

By the first and second sleeves 60, 62, the movement of the inner tube 30 relative to the outer tube 20 and the cylinder 40 is guided and the inner tube 30 and the cylinder 40 are always located at the central axis of the outer tube 20 and do not swing to affect the movement. The cylinder 40 is equipped with the buffering member 50 to buffer the impact between the cylinder 40 and the connection part 11 of the fixing member 10 when the inner tube 30 moves relative to the outer tube 20. The first positioning portion 44 securely fixes the cylinder 40 to the first positioning member 23 so that the cylinder does not swing.

When assembling, the cylinder 40 and the piston rod 41 are inserted into the inner tube 30 and the inner tube 30 and the cylinder 40 are inserted into the outer tube 20. The collar 22 is locked to the outer tube 20. The piston rod 41 is connected to the passage 13 and contacts the pressing member 42. The inner tube 30 is connected to the connection part 11 of the fixing member 10. The first positioning portion 44 is then connected to the first positioning member 23 to complete the assembly.

Figure 4:
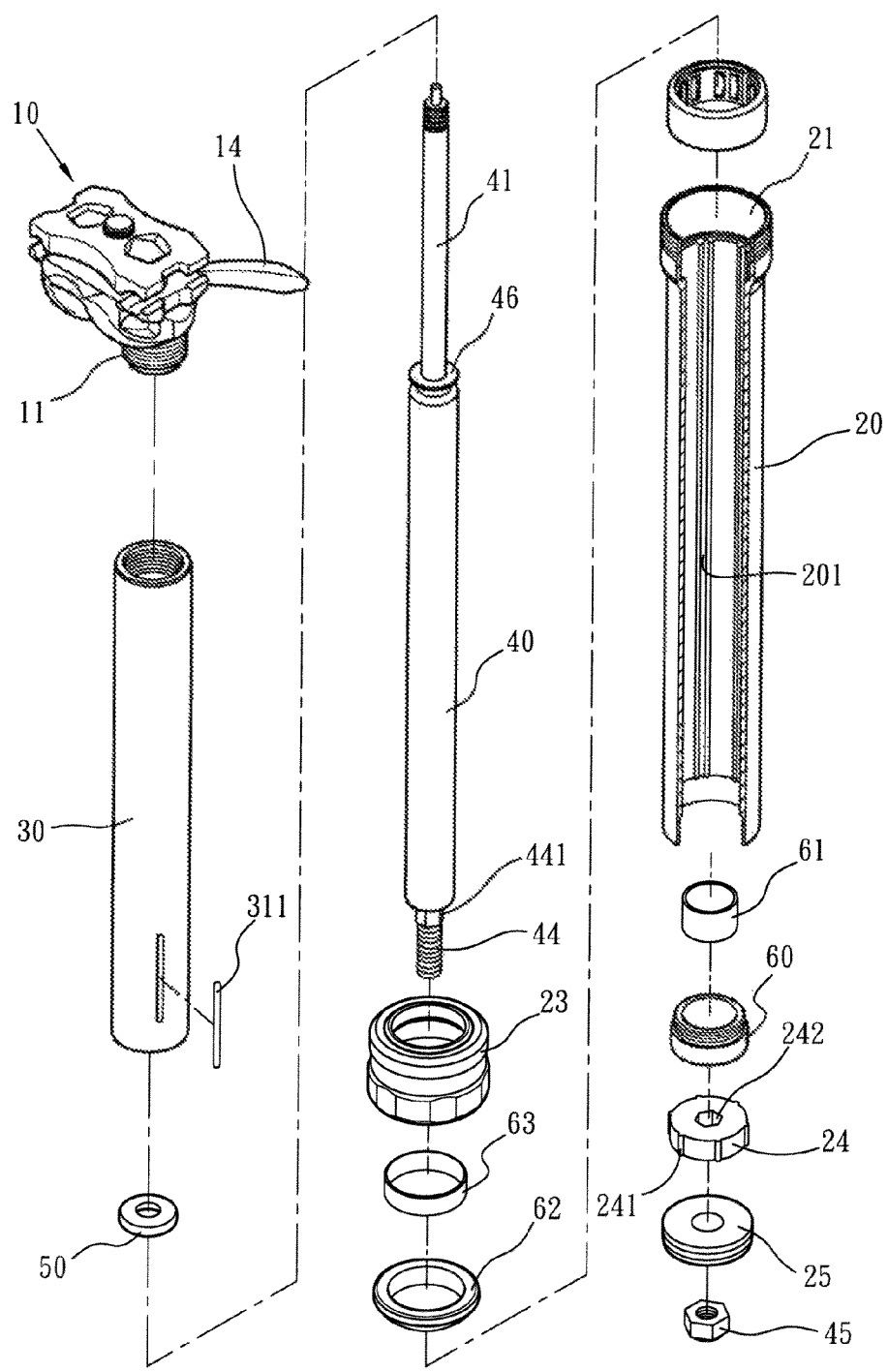
FIG. 4 is an exploded view to show the second embodiment of the seat adjustment assembly of the present invention.
Figure 5:
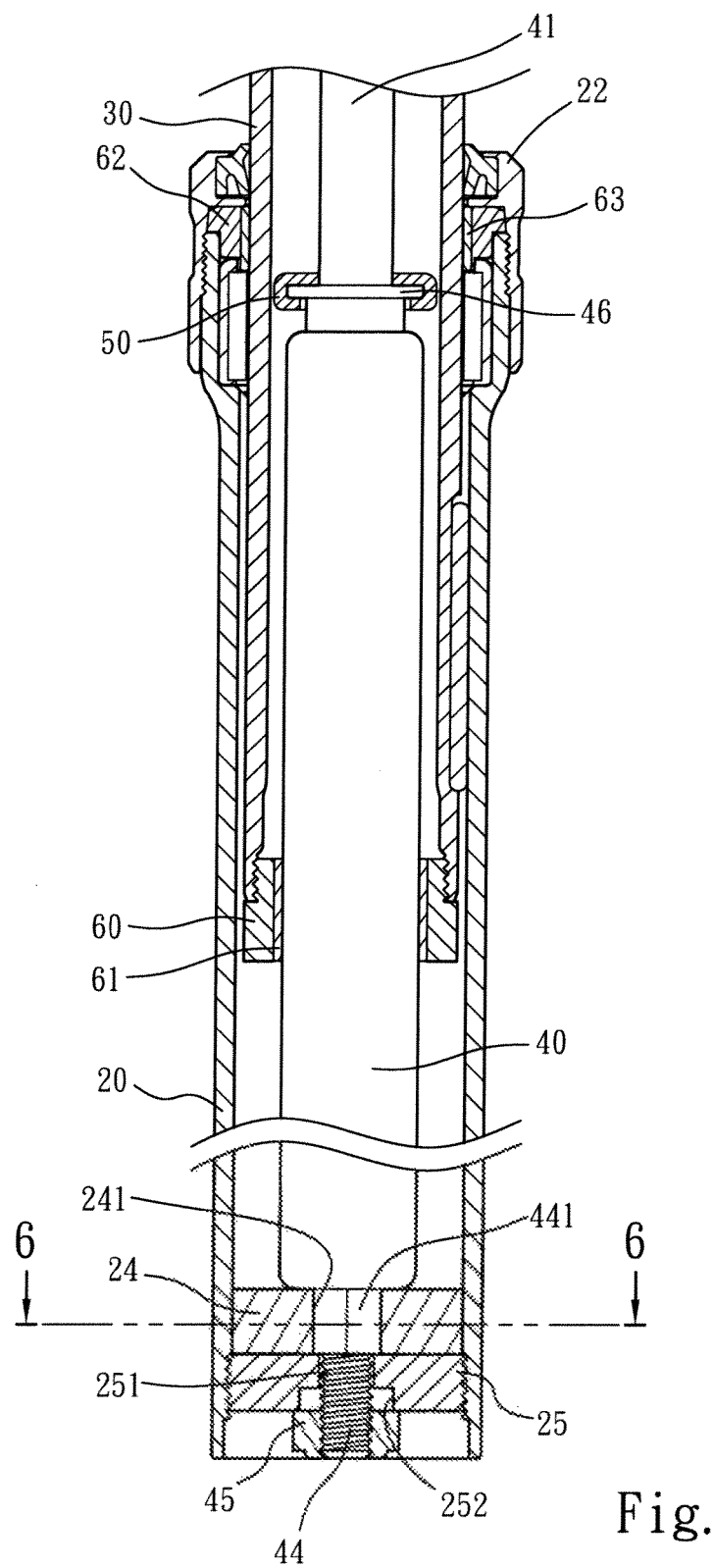
FIG. 5 is an enlarged cross sectional view of the seat adjustment assembly of the present invention in FIG. 4.
Figure 6:
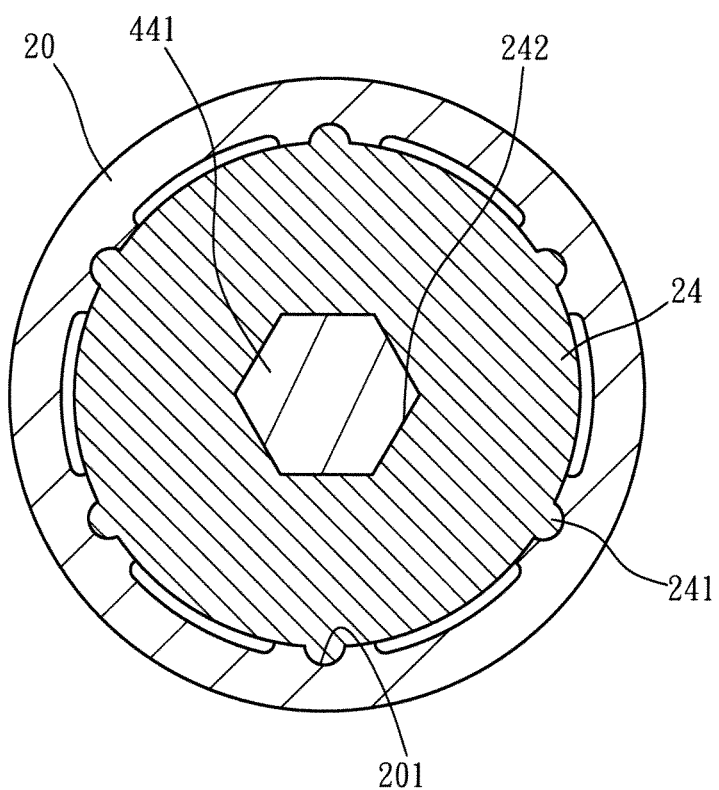
FIG. 6 is an end cross sectional view to show the second positioning member engaged with the inside of the outer tube of the second embodiment of the seat adjustment assembly of the present invention.

As shown in FIGS. 4 to 6 and which show the second embodiment, wherein the first positioning portion 44 is a threaded rod, and a positioning section 441 is located between the first positioning portion 44 and the cylinder 40. The positioning section 441 is a polygonal rod and the through hole 242 of the second positioning member 24 has a complementary polygonal inner periphery to the positioning section 441. The outer diameter of the positioning section 441 is larger than the outer diameter of the first positioning portion 44. The second positioning member 24 is located in the bottom end of the outer tube 20 and has multiple ribs 241 extending from the outside surface of the second positioning member 24, to be engaged with the grooves 201 in the interior of the outer tube 20 to prevent from rotation of the second positioning member 24. The second positioning member 24 has a hexagonal positioning hole 242 with which the hexagonal positioning section 441 is engaged. An end member 25 is connected to the second positioning member 24 and connected to the inside of the outer tube 20. The end member 25 has a through hole 251 through which the first positioning portion 44 extends. A driving hole 252 is defined in one side of the end member 25 so that a tool is inserted into the driving hole 252 to adjust the position of the end member 25 so as to urge the second positioning member 24 and adjust a distance between the second positioning member 24 and the cylinder 40 relative to the outer tube 20. By this embodiment, the cylinder 40 can also be secured.

Figure 7:
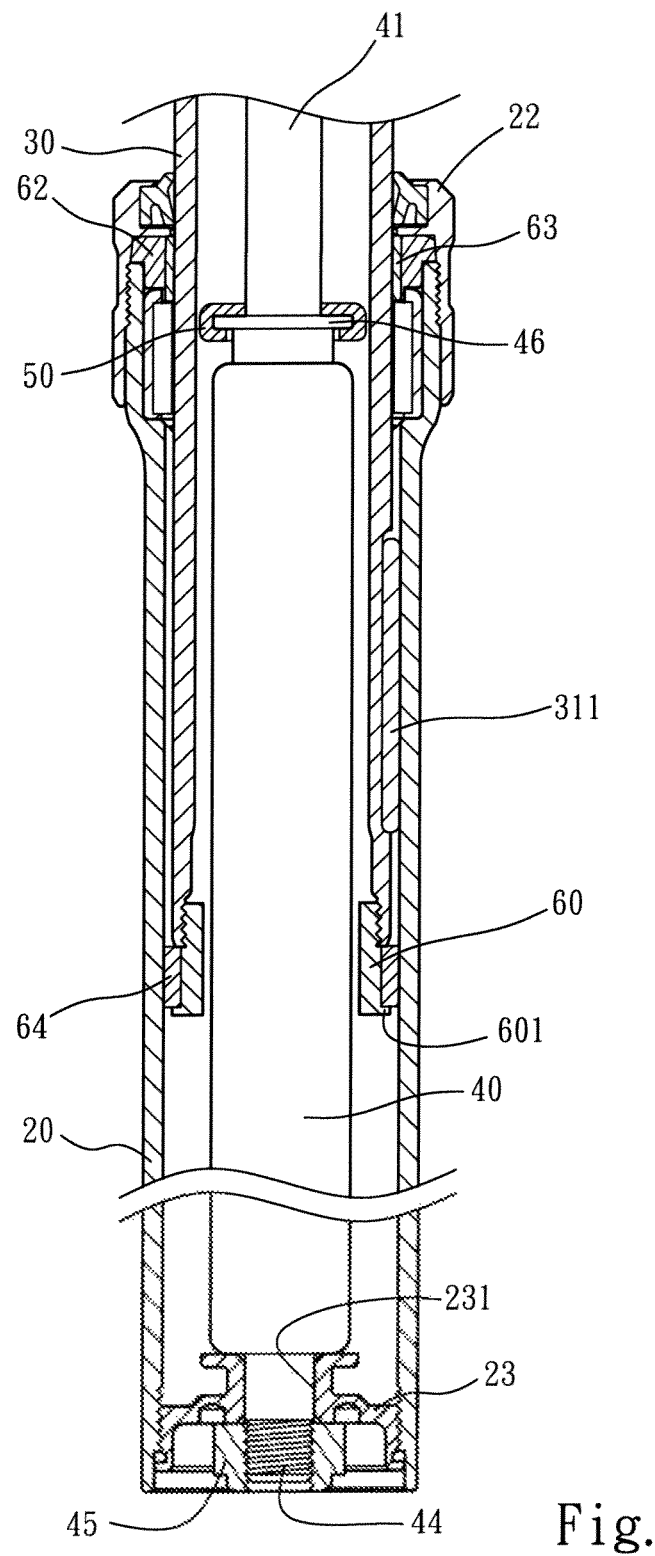
FIG. 7 is an enlarged cross sectional view of the third embodiment of the seat adjustment assembly of the present invention.
Figure 8:
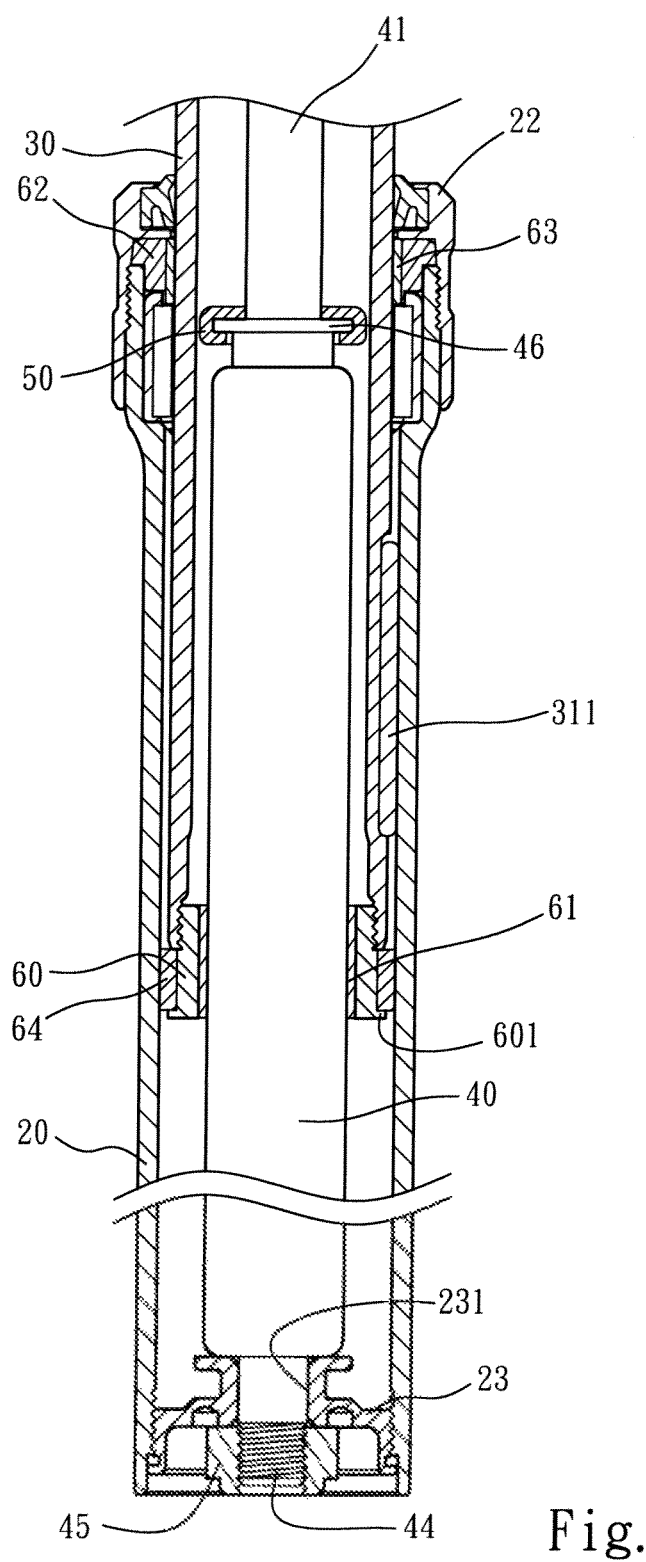
FIG. 8 is an enlarged cross sectional view of the fourth embodiment of the seat adjustment assembly of the present invention.

FIG. 7 shows the third embodiment, wherein the first sleeve 60 has a third bush 64 mounted thereto which is in contact with inside of the outer tube 20. The first sleeve 60 includes a flange 601 which supports and stops the third bush 64. This arrangement can guide the relative movement of the inner tube 30 relative to the outer tube 20. FIG. 8 shows the fourth embodiment, wherein a first bush 61 is in the first sleeve 60 and is mounted to outside of the cylinder 40. The first sleeve 60 has a third bush 64 mounted to the inside of the outer tube 20. This arrangement can guide the relative movement of the inner tube 30 relative to the outer tube 20.

When adjusting the seat, the user pivots the lever 14 to move the piston rod 41, so that the inner tube 30 is moved relative to the outer tube 20. The first and second sleeves 60, 62 guide the movement of the inner tube 30 and the piston rod 41 of the cylinder 40 therewith relative to the outer tube 20 to ensure that the inner tube 30 and the cylinder 40 are located at the central axis of the outer tube 20 and do not swing. The cylinder 40 is equipped with the buffering member 50 to buffer the impact between the cylinder 40 and the connection part 11 of the fixing member 10 when the inner tube 30 moves relative to the outer tube 20. The arrangement also improves the noise and leakage problems.

The first positioning portion 44 connected to the cylinder 40, and the engagement between the through hole 231 and the first positioning portion 44 ensure that the cylinder 40 is located at the central position and does not swing.

While we have shown and described the embodiment in accordance with the present invention, it should be clear to those skilled in the art that further embodiments may be made without departing from the scope of the present invention.

What is claimed is:

1. A bicycle seat adjustment assembly comprising:
   a fixing member configured to be connected to an underside of a seat, a lever pivotably connected to the fixing member and a connection part extending from an underside of the fixing member, the connection part having a passage and an end of the lever located at an end of the passage;
   an outer tube having a first end configured to be connected with a bicycle frame and a second end of the outer tube having a reception room which is in open communication with an interior of the outer tube, a collar mounted to an outside of the reception room of the outer tube, and a positioning member connected to the first end of the outer tube;
   an inner tube located in the outer tube and a first end of the inner tube extending out from the outer tube and connected with the connection part, the connection part extending into the inner tube;
   a cylinder located within the outer tube and the inner tube, a piston rod located in the cylinder and a first end of the piston rod extending out from a first end of the cylinder and connected to the connection part within the passage, the first end of the piston rod being in operable contact with the lever to retract the piston rod and the inner tube therewith, a first positioning portion connected to a second end of the cylinder and connected to the positioning member for fixing the cylinder within the outer tube, the cylinder including a second positioning portion at the first end thereof;
   a buffering member located within the inner tube and comprising an annular ring circumscribing the second positioning portion and overlaying the first end of the cylinder with an opening formed therein for passage of the piston rod therethrough, the buffering member buffering, an impact between the first end of the cylinder and the connection part of the fixing member when the inner tube is displaced into the outer tube as the piston rod is displaced into the cylinder; and
   a first sleeve mounted to a second end of the inner tube.

2. The assembly as claimed in claim 1, wherein a pressing member is located between the first end of the piston rod in the passage and the lever, a spring is located between the piston rod and the pressing member.

3. The assembly as claimed in claim 1, wherein the first positioning portion is a rod and the positioning member has a through hole defined centrally therethrough which is located corresponding to the first positioning portion, the first positioning portion extends through the through hole, a fastening member is connected to the first positioning portion.

4. The assembly as claimed in claim 3, wherein the first positioning portion is a threaded rod, a positioning section is located between the first positioning portion and the cylinder, the positioning section is a polygonal rod and the through hole of the positioning member has a complementary polygonal inner periphery to the positioning section.

5. The assembly as claimed in claim 4, wherein the outer tube includes multiple axial grooves defined in an inner periphery thereof and the positioning member includes multiple ribs extending from an outside thereof, the ribs being engaged within the grooves to prevent rotation of the positioning member relative to the outer tube.

6. The assembly as claimed in claim 3, wherein an end member is connected to the positioning member so as to secure the positioning member.

7. The assembly as claimed in claim 6, wherein the end member is connected to an inside of the outer tube and urges the positioning member.

8. The assembly as claimed in claim 1, wherein the first sleeve has a first bush received therein which is mounted to an outside of the cylinder.

9. The assembly as claimed in claim 8, wherein the first bush is made of plastic.

10. The assembly as claimed in claim 1, wherein the first sleeve has a first bush received therein which is mounted to an outside of the cylinder; and wherein a second sleeve is located between the reception room and the collar, the second sleeve including an annular second bush in a central hole thereof, the second bush being mounted on an outside of the inner tube.

11. The assembly as claimed in claim 10, wherein the second bush is made of plastic.

12. The assembly as claimed in claim 10, wherein the first sleeve has a third bush mounted thereto which is in contact with an inside of the outer tube.

13. The assembly as claimed in claim 12, wherein the third bush is made of plastic.

14. The assembly as claimed in claim 1, wherein a first bush is in the first sleeve and is mounted to an outside of the cylinder, a second sleeve is located on an outside of the inner tube between the reception room and the collar, the first sleeve has a third bush mounted thereto which is in contact with an inside of the outer tube.

\* \* \* \* \*